United States Patent [19]

Davis

[11] 4,293,411
[45] Oct. 6, 1981

[54] STEAM SEAL FOR DISC FILTER

[75] Inventor: Steven S. Davis, Bountiful, Utah

[73] Assignee: Envirotech Corporation, Menlo Park, Calif.

[21] Appl. No.: 114,855

[22] Filed: Jan. 24, 1980

Related U.S. Application Data

[63] Continuation of Ser. No. 984,844, Oct. 5, 1978, abandoned, which is a continuation of Ser. No. 783,099, Mar. 31, 1977, abandoned.

[51] Int. Cl.³ .................. B01D 35/18; B01D 33/26
[52] U.S. Cl. ................................ 210/178; 210/327; 210/331
[58] Field of Search .............. 210/68, 77, 178, 179, 210/330, 331, 390, 395, 402, 406, 327

[56] References Cited

U.S. PATENT DOCUMENTS

| | | | |
|---|---|---|---|
| 1,538,980 | 5/1925 | Genter | 210/327 X |
| 2,102,293 | 12/1937 | Sweetland | 210/327 |
| 2,742,177 | 4/1956 | Watson | 210/68 X |
| 3,190,451 | 6/1965 | Holland | 210/406 |
| 3,245,538 | 4/1966 | Leonard | 210/331 X |
| 3,361,259 | 1/1968 | von der Gathen et al. | 210/68 X |
| 3,592,341 | 7/1971 | Emmett, Jr. et al. | 210/68 |
| 3,698,556 | 10/1972 | Emmett, Jr. et al. | 210/178 |
| 3,969,247 | 7/1976 | Emmett, Jr. et al. | 210/68 |

OTHER PUBLICATIONS

Envirotech Brochure Entitled "EIMCO AGIDISC FILTER for Dewatering Free-Settling Material", Feb. 1974, 12 pp.
EIMCO Processing Machinery Division Engineering Drawing Entitled "Steam Hood", drawing No. 80936 D96, Prior to 3/31/76.

Primary Examiner—Robert H. Spitzer
Attorney, Agent, or Firm—Robert E. Krebs; T. J. McNaughton

[57] ABSTRACT

Apparatus is disclosed for steam drying a cake of filtered solids formed on a disc filter element of a rotary disc vacuum filter where the disc filter element is mounted on a rotating means for rotation in a container, the lower portion of which includes a slurry tank and the upper portion of which includes a steam hood. The steam hood encloses a portion of the disc filter element in a steam chamber and includes a pair of sidewalls and a spine wall which joins the pair of sidewalls. A linear seal means is mounted to the pair of sidewalls of the hood to define a steam-retaining exit for the steam chamber through which the disc filter element rotatably moves, and includes two elongated flexible flaps which extend in a straight line from the spine wall into the slurry tank.

1 Claim, 6 Drawing Figures

4,293,411

STEAM SEAL FOR DISC FILTER

This is a continuation of application Ser. No. 984,844, filed Oct. 5, 1978, which was a continuation of application Ser. No. 783,099 filed on Mar. 31, 1977, both now abandoned.

FIELD OF THE INVENTION

This invention relates generally to pressure differential filtration, and, in particular to filtration wherein a relatively dryer filter cake is obtained during drying by passing steam into filter cake formed on a filter.

STATE OF THE ART

The use of steam as an aid in reducing the moisture content of filter cake is known in the art. It is further known to construct a rotary disc vacuum filter of a type having a tank with upstanding sidewalls to contain a slurry to be filtered; means for introducing the slurry into the tank; and a disc filter element mounted in the tank for rotation about a horizontal trunnion to continuously pass a portion of the disc filter element into and out of the slurry in the tank.

To provide the rotary disc vacuum filter with steam assisted drying it is also known to mount a hood on the tank of the filter to enclose above the slurry in a chamber a portion of the filter element on which filter cake has formed. Steam is conveyed to the chamber by a steam supply means connected in communication with the hood so that during at least a part of the drying cycle steam condenses in the filter cake. The condensation of steam in the filter cake releases heat to lower the viscosity of the water or other liquid contained in the filter cake. The lower viscosity produces better draining efficiency and a reduction of the residual moisture content of the filter cake.

Notwithstanding such teachings of the prior art, previous hoods for providing a chamber in which steam is applied to a filter cake have not provided optimum efficiency. The previous hoods have lacked the necessary structure for minimizing steam leakage from the chamber at the steam seal through which the disc filter element exits the chamber. Heretofore, the exit steam seals of hoods have been non linear. The presence of a non linear seal portion results in steam losses and maintenance problems. An example of this type of seal at the exit of a steam chamber is taught in U.S. Pat. No. 3,398,556.

Weight has been another disadvantage of the previous steam hoods. The exterior surfaces of the hoods have been typically made of metal to minimize distortion of the hood due to expansion and contraction, the result of temperature variations. Distortion of the hood contributes to the difficulties of providing the steam chamber of the hood with efficient steam seals.

OBJECTS OF THE INVENTION

An object of this invention is to provide for a rotary disc vacuum filter, a hood having a steam chamber with steam seals of increased efficiency to reduce steam losses. Another object is to provide a light weight hood.

BRIEF DESCRIPTION OF THE FIGURES

Further objects and advantages of the invention will be apparent from the following detailed descriptions, taken in conjunction with the accompanying drawings illustrating a preferred embodiment of the invention.

In the drawings.

PREFERRED EMBODIMENT OF THE INVENTION

Figure 1:
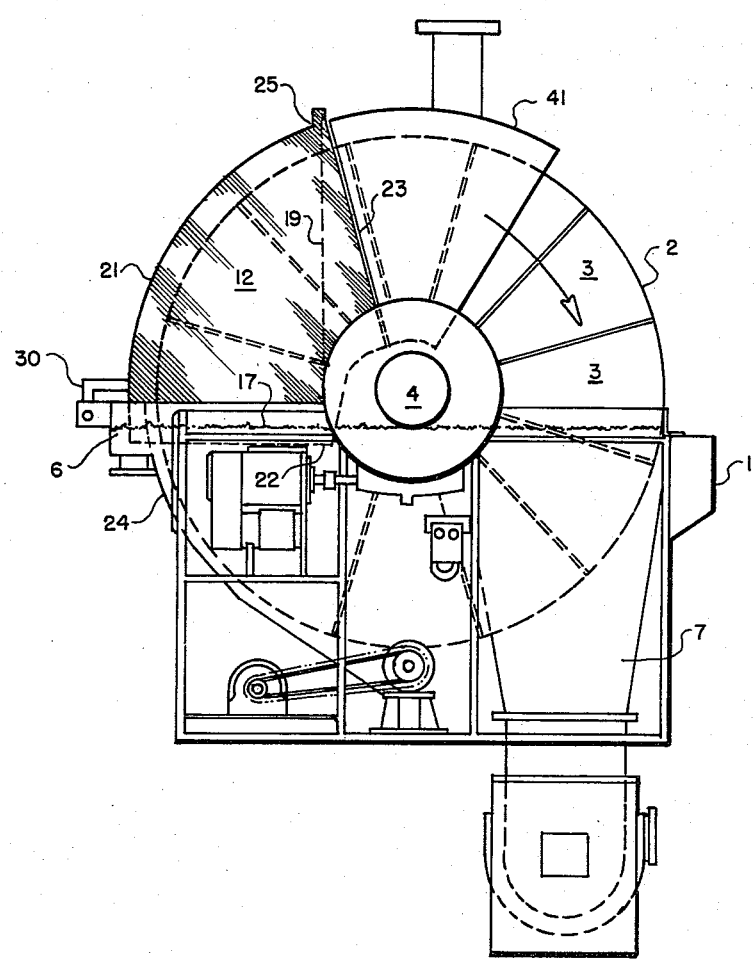
FIG. 1 is a partial side elevation view of a rotary disc vacuum filter with a steam hood according to the present invention.
Figure 2:
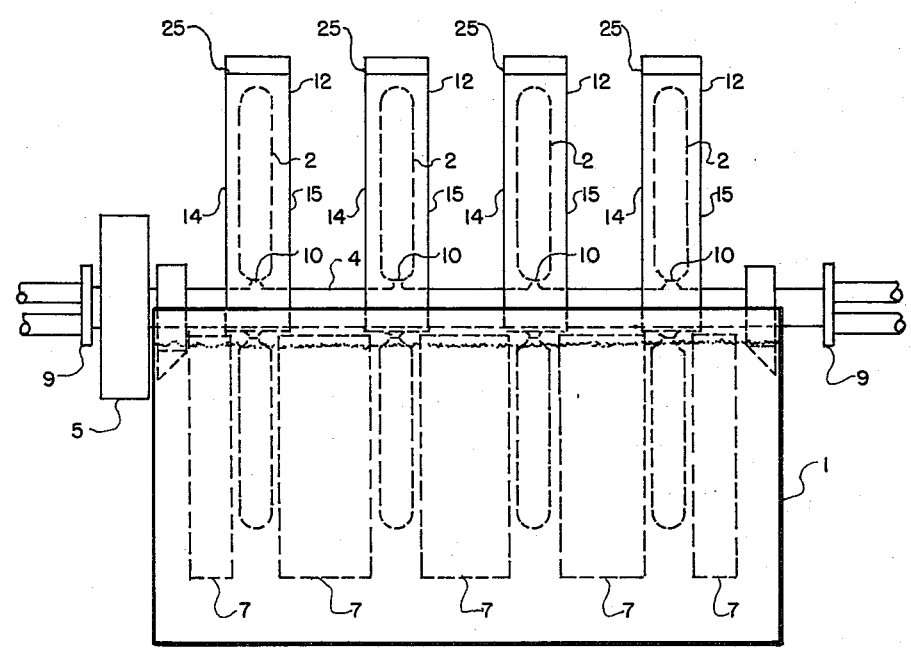
FIG. 2 is a front elevation of the filter shown in FIG. 1.

Referring to FIGS. 1 and 2, a conventional rotary disc vacuum filter includes a tank 1 with upstanding sidewalls to contain a slurry to be filtered. A filter disc 2 which includes a plurality of filter sectors 3, is mounted in a plurality at spaced intervals along a center barrel 4 such that the sectors 3 of each disc 2 are perpendicular to and extend radially from the center barrel 4. The center barrel 4 is rotatably mounted on the tank 1 to rotate about a horizontal axis to sequentially pass the sectors 3 of the disc 2 clockwise as shown in FIG. 1, into and out of the slurry. The center barrel 4 is rotated by a drive unit 5 mounted on the tank 1 as shown in FIG. 2.

To introduce slurry to the tank 1, a launder 6 is mounted on a side of the tank 1 at the slurry surface. To carry filter cake from the tank 1, chutes 7 are mounted in the tank 1 on the side of the tank 1 with respect to the barrel 4, on which the sectors 3 rotate into the slurry. The chutes 7 are positioned on either side of each filter disc 2 to receive filter cake formed on the sectors 3.

To carry filtrate from the tank 1, the center barrel 4 includes therein a plurality of longitudinal conduits. Each conduit of the plurality connects in flow communication with a valve unit 9 mounted on the tank 1 as shown in FIG. 2 and has openings 10 spaced at intervals along its length extending radially outward to connect in flow communication with the interior of sectors 3 of different discs 2. The valve unit 9 provides vacuum or pressure thrugh the conduits to the interior of the sectors 3 at different periods in the rotation of the sectors 3. Vacuum is applied while the sectors 3 are submerged in the slurry to cause a filter cake to form on media surfaces of the sectors 3 and to carry filtrate from the tank 1 and also during subsequent drying to dewater the filter cake formed and to carry additional filtrate including condensed steam from the tank 1. Pressure is applied following drying just before the sectors 3 are resubmerged to dislodge the dewatered filter cake from the sectors 3 and into the chutes 7.

Figure 3:
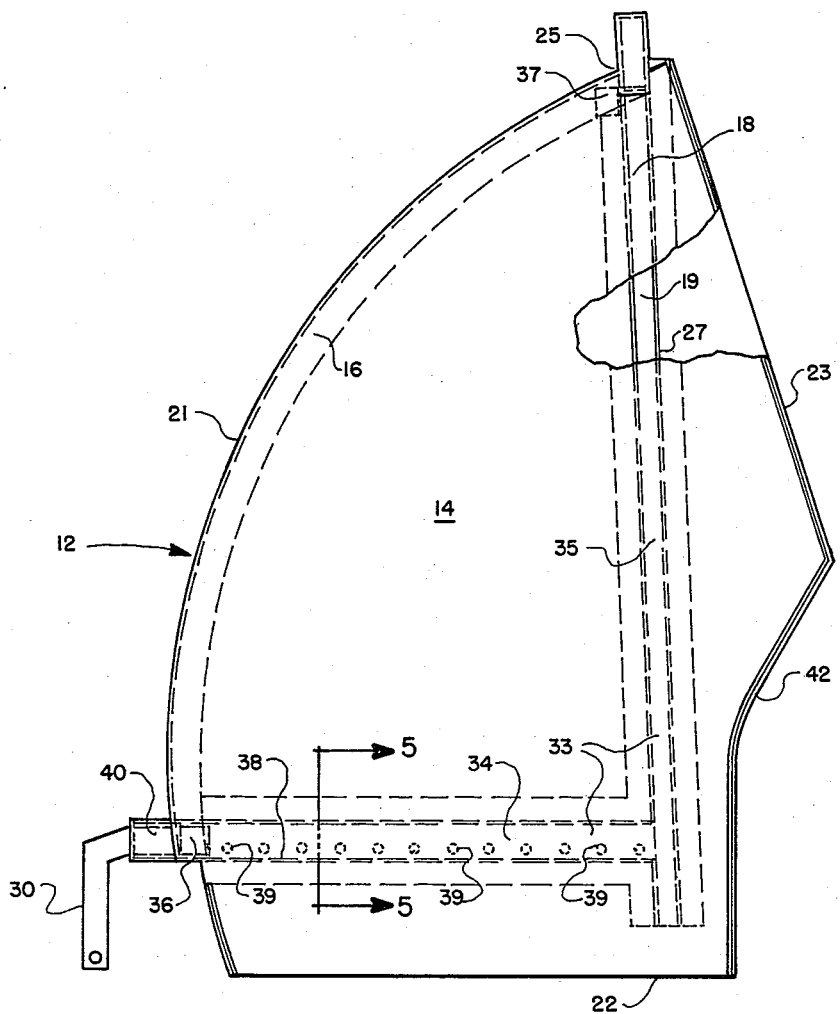
FIG. 3 is a partial side sectional view of the steam hood shown in FIG. 1.
Figure 4:
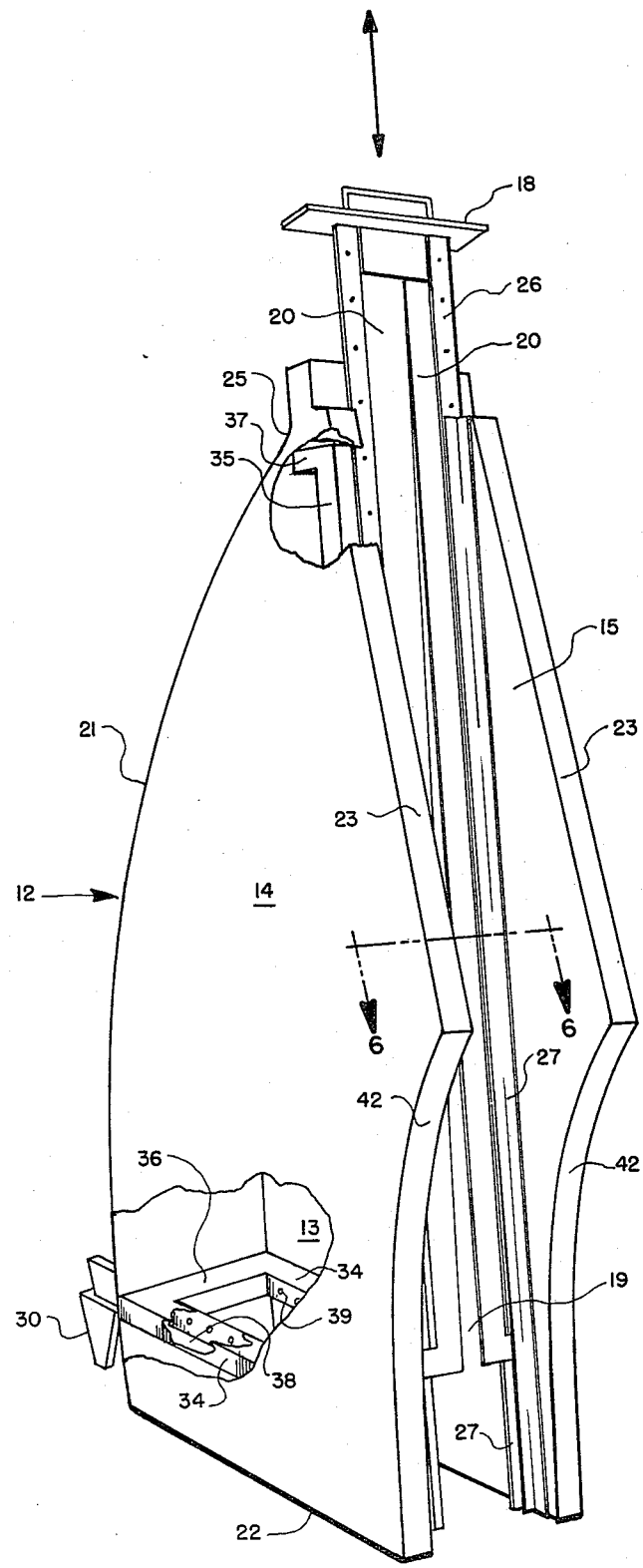
FIG. 4 is a partial perspective view with cutaway of the steam hood of FIG. 3.

A steam hood 12, the focus of this invention, is mounted on the tank 1 over the slurry to define a chamber in which a steam environment is maintained and through which the disc 2 rotatably moves during a portion of the drying cycle of the disc 2 above the slurry. A single steam hood 12 is applied to an individual filter disc 2 as shown in FIG. 2. The steam hood 12, as shown in FIGS. 3 and 4, includes a pair of spaced-apart vertically-extending sidewalls 14 and 15, to define a chamber 13 through which the media surfaces of the sectors 3 of the disc 2 sequentially pass and a spine wall 16 which sealingly joins the two sidewalls.

An entrance 17 for the hood 12 through which the sectors 3 enter the chamber 13 is formed below the upper edges of the sidewalls of the tank 1 by the slurry surface within the hood 12 enclosed by the interior surfaces of the sidewalls 14 and 15 and spine wall 16. As so formed, the entrance 17 provides an unconstricted entrance allowing excess slurry and cake on the sectors 3 to return to the slurry.

A linear seal means 18 for the hood 12 through which the sectors rotatably move to exit the chamber 13 is mounted on the sidewalls 14 and 15 of the hood 12 to define a steam retaining exit 19. The linear seal means 18 includes two elongated flexible flaps 20 which are mounted to opposite ones of said sidewalls 14 and 15 to sealingly press against cakes of filter solids formed on the surface of the sectors 3 of the disc 2 and which extend in a straight line from the spine wall 16 of the hood 12 to below the upper edges of the sidewalls of the tank 1 so as to extend into the slurry contained in the tank 1. The linear seal means 18 intersects at the slurry surface with the entrance 17 which is defined thereat by the slurry surface. Preferably the flexible flaps 20 of the linear seal means 18 extend below the upper edges of the sidewalls of the tank 1 offset to the side of the tank 1 with respect to the center barrel 4 from which the sectors 3 rotate out of the slurry. This is the preferred position for the linear seal means 18 because the center barrel 4 is excluded from the chamber 13. It is also preferred that the flexible flaps 20 extend substantially vertically.

In further detail, the sidewalls 14 and 15 of the steam hood 12 are mounted in parallel to and spaced from either side of the disc 2 to provide sufficient room within the chamber 13 between the sidewalls and the disc 2 to allow filter cake built-up in the slurry to be carried on the media surfaces of the sector 3 and for steam to circulate within the chamber 13.

The sidewalls 14 and 15 each have a curved portion 21, a bottom edge 22 and a straight edge 23. The curved portions 21 of the sidewalls are substantially concentric with the curve of the outer edge of the filter disc 2 and are joined by the spine wall 16 to enclose the steam chamber 13 at the outer edge of the disc 2. In joining the curved portion 21 the spine wall 16 extends from a tank sidewall 24 to the top 25 of the hood 12 and is curved to be substantially concentric with and spaced from the outer edge of the filter disc 2. The bottom edge 22 of each of the sidewalls extends below the surface of the slurry from the tank sidewall 24 toward the center barrel 4 to form a steam seal along the bottom edge 22 between the chamber and the atmosphere. The flexible flaps 20 of the linear seal means 18 are near vertical and extend from the top 25 of the hood 12 into the slurry.

Figure 6:
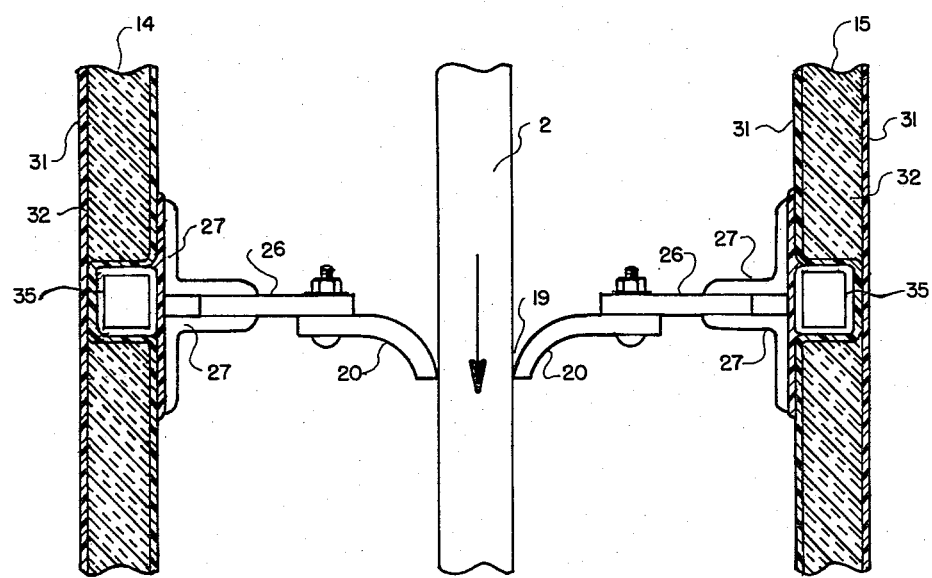
FIG. 6 is a top view of the linear seal means 18 along line 6—6 of FIG. 4.

The linear seal means 18 of the hood 12 as shown in FIGS. 3, 4 and 6, includes a U-shaped assembly 26 to which the flexible flaps 20 are bolted. The assembly 26 is slideably mounted in a track defined by a pair of linear guide means which are mounted on opposite ones of the sidewalls 14 and 15 and which extend in a straight line from the spine wall 16 to adjacent the bottom edges 22 of the sidewalls 14 and 15. Each linear guide means includes a pair of guide strips 27. The flexible flaps 20 of the assembly 26 are positioned to overlap each other in the absence of the disc 2 at the top 25 of the hood 12 with a lessening of overlap and then a slight gap at the slurry surface.

A pivot support 30 is attached to the outside of the spine wall 16 of the hood 12 and contacts the tank sidewall 24. The pivot support 30 provides means by which the hood 12 can be tilted back and away from the disc 2.

Figure 5:
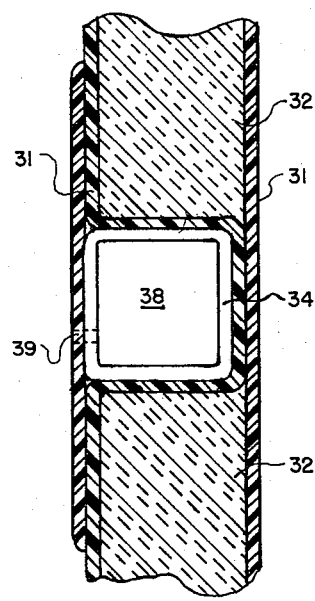
FIG. 5 is a partial sectional view along line 5—5 of FIG. 3.

As constructed, the sidewalls 14 and 15 and spine wall 16 of the steam hood 12, as shown in FIG. 5, have double walls 31 with insulation 32 therebetween. Fibreglass is a suitable material for the double walls. To provide structural strength and minimize distortion problems, the hood 12 includes an integral tubular frame 33 of metal connected to support the sidewalls 14 and 15 and spine wall 16.

The tubular frame 33 includes integral to and connected to support each of the sidewalls 14 and 15, a first elongated tubular member 34 and a second elongated tubular member 35. The first member 34 is mounted to extend substantially horizontally from the spine wall 15 towards said linear seal means 18. The second member 35 is mounted to extend substantially parallel to the flexible flaps 20 from the spine wall to a juncture with said first member 34. The tubular frame 33 also includes integral to and connected to support the spine wall 16, a first tubular joining member 36 and a second tubular joining member 37. The first joining member 36 extends across the spine wall 16 and joins, and preferably in flow communication, the first members 34 of the two sidewalls 14 and 15. The second joining member 37 extends across the spine wall 16 and joins the second members 35 of the sidewalls 14 and 15.

When joined in flow communication the first members 34 and first joining member 36 can be utilized as a steam conduit 38 for conveying dry steam to the steam chamber 13. A plurality of orifices 39 are formed through and spaced along each of the first members 34 between the spine wall 16 and the linear seal means 18 along the interior surface of the sidewalls 14 and 15 to provide flow communication to the steam chamber 13. A pipe 40 is connected in flow communication to the first joining member 36 and steam is supplied to the pipe.

Steam escaping at the linear seal means 18 of the chamber 13 is captured by an exhaust hood 41. The exhaust hood 41 is mounted over the tank 1 to cover a portion of the disc 2 adjacent the linear seal means 18.

As part of a seal between the steam hood 12 and the exhaust hood 41, the straight edge 23 of each of the sidewalls 14 and 15 extends increasing outward from the linear seal means 18 as the sidewalls extend down from the top 25 of the hood to a point approximately midway to the slurry surface. From this point, the sidewalls have a curved portion 42 which extends back toward the slurry surface at the linear seal means 18. The curved portion 42 is concentric in part with and spaced from the center barrel 4.

In operation, a slurry to be filtered is introduced into the tank 1 through the launder 6 as the center barrel 4 rotates the filter disc 2. Vacuum is applied to the interior of the filter sectors 3 of the disc 2 as the sectors 3 enter the slurry and a filter cake forms on the media surfaces of the sectors 3. As the disc 2 rotates, the sectors 3 emerge from the slurry and proceed through the steam chamber 13 of the hood 12 from the entrance 17 to the exit 19. In the chamber 13, a steam environment is maintained by injection of dry steam through conduit 38 to the orifices 39. The sectors 3 exit the chamber 13 and at a point adjacent the chutes 7 the vacuum is replaced by pressure. The pressure causes the filter cake to discharge into the chutes 7. The sectors 3 then reenter the slurry, at which point vacuum is again applied to the sectors 3 and the cycle is repeated.

I claim:

1. An improved filter apparatus comprising a tank with upstanding sidewalls for containing slurry to be filtered, a plurality of generally circular discs, said discs being mounted spaced apart from each other on a center barrel for rotation through the slurry in the tank, each disc comprising a plurality of sectors, each sector of each disc being immersed in said slurry for a first portion of each rotation and being withdrawn from said slurry for a second portion of each rotation of said disc, means being provided to enable vacuum communication between each sector and said center barrel so as to cause formation of a cake on a surface of each sector when the sector is immersed in said slurry, said cake comprising material to be filtered from said slurry, and means being provided for removing said cake from said surface of the sector when the sector is withdrawn from said slurry;

said filter apparatus further having means for steam drying said cake on each sector of each disc after the sector is withdrawn from said slurry and before said cake is removed from the sector, said steam drying means including:

a plurality of steam hood assemblies, each steam hood assembly defining an enclosed region above the surface of said slurry over a portion of a corresponding one of said discs, said steam hood assembly being positioned so that each sector of said corresponding disc passes through said enclosed region during part of the second portion of each rotation of said disc, and means for introducing dry steam into said enclosed region to dry said cake on the surface of the sector as the sector passes through said enclosed region;

said steam hood assembly comprising first and second sidewalls, and a spine wall; said first and second sidewalls being spaced apart from each other to accommodate passage of said corresponding disc therebetween during said rotation of said disc, said spine wall joining said first and second sidewalls, said spine wall being curved to have an inside surface that is substantially concentric with said disc, each of said first and second sidewalls and said spine wall having a bottom edge that extends below the surface of said slurry to form a steam seal for said enclosed region along the surface of said slurry, and seals attached in opposed relation to the sidewalls so as to press sealingly against the cake material on said disc as said disc rotates, said seals extending below the surface of said slurry; wherein the improvement comprises:

said seals being solely comprised of a pair of straight flexible flaps that are respectively mounted to said first and second sidewalls in opposed relationship and said flaps extending vertically from a position on said spine wall that is remote from the surface of said slurry to below the surface of said slurry on the side of said tank with respect to the center barrel from which the filter sectors rotate out of the slurry such that the center barrel is excluded from the enclosed region;

said first and second sidewalls, said spine wall and said flaps forming said enclosed region into which each sector of said corresponding disc enters immediately upon being withdrawn from said slurry, and in which each sector of said disc remains until being rotated past said flaps with said center barrel being entirely excluded from said enclosed region.

* * * * *